(12) United States Patent
Allan et al.

(10) Patent No.: US 6,243,522 B1
(45) Date of Patent: Jun. 5, 2001

(54) PHOTONIC CRYSTAL FIBER

(75) Inventors: Douglas Clippinger Allan, Corning; Nicholas Francis Borrelli, Elmira; James Conrad Fajardo, Horseheads; Richard Michael Fiacco, Corning; Daniel Warren Hawtof, Painted Post; James Andrew West, Geneseo, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/434,364

(22) Filed: Nov. 5, 1999

Related U.S. Application Data

(60) Provisional application No. 60/113,087, filed on Dec. 21, 1998.

(51) Int. Cl.[7] .......................................................... G02B 6/02
(52) U.S. Cl. .......................... 385/123; 385/124; 385/126
(58) Field of Search ..................................... 385/123, 124, 385/126, 127, 142, 144; 372/6, 90; 65/390, 391, 399, 403, 412

(56) References Cited

U.S. PATENT DOCUMENTS

| | | | |
|---|---|---|---|
| 5,742,722 | * 4/1998 | Imoto | 385/126 |
| 5,748,824 | 5/1998 | Smith | 385/124 |

FOREIGN PATENT DOCUMENTS

0810453A1  6/1997  (EP) .

OTHER PUBLICATIONS

T.A. Birks, et al., "Endlessly single–mode photonic crystal fiber", Optics Letters, Jul. 1, 1997, vol. 22, No. 13, pp 961–963.

Noda et al., "New Realization Method for Three–Dimensional Photonic Crystal in Optical Wavelength Region", Jpn. J. Appl. Phys., Jul. 15, 1996, vol. 35, Part 2, No. 7B, pp L909–L912.

J.C. Knight, et al., "All–silica single–mode optical fiber with photonic crystal cladding", Optics Letters, Oct. 1, 1996, vol. 21, No. 19, pp 1547–1549.

\* cited by examiner

*Primary Examiner*—Phan T. H. Palmer
(74) *Attorney, Agent, or Firm*—William J. Chervenak

(57) ABSTRACT

Disclosed is an optical waveguide fiber preform which is an assembly of one or more core rods surrounded by a plurality of clad rods. The clad rods have a central portion and a surrounding layer, in which the refractive index of the central portion is lower than that of the surrounding layer. The preform is drawn into an optical waveguide fiber that has a two component clad layer. Proper choice of the central portion and surrounding layer provide a waveguide fiber that is endlessly single mode. Alternative embodiments include fibers containing dopants that enhance fiber photosensitivity or which provide stress-induced or asymmetric-refractive-index-induced birefringence in the waveguide fiber.

34 Claims, 5 Drawing Sheets

PHOTONIC CRYSTAL FIBER

This application claims the benefit of U.S. Provisional Patent Application No. 60/113,087, filed Dec. 21, 1998.

BACKGROUND OF THE INVENTION

The invention relates to an optical waveguide fiber. In particular, the core to clad refractive index contrast in the waveguide fiber is achieved by incorporating a photonic-crystal-like structure into the fiber clad layer.

Waveguide fibers having a photonic crystal clad layer have been described in the literature. At present the photonic crystal fiber (PCF) includes a porous clad layer, i.e., a clad layer containing an array of voids that serves to change the effective refractive index of the clad layer, thereby changing the properties of the waveguide fiber such as mode field diameter or total dispersion. The distribution of light power across the waveguide (mode power distribution) effectively determines the properties of an optical waveguide. Changing the effective index of the clad layer changes the mode power distribution and thus the waveguide fiber properties.

In addition to the properties set forth above, the cut off wavelength is also affected by the clad layer structure is cut-off wavelength. An advantageous feature of a porous clad PCF is that a particular choice of pore size and pore distribution in the clad layer results in the fiber transmitting a single mode for signals having essentially any wavelength. That is the wavelength span of the cut off wavelength is large without bound. Such a PCF has been denoted "endlessly single mode". An additional benefit afforded by the PCF is the availability of high contrast in refractive index between core and clad at dopant levels near to or lower than the levels in non-PCF waveguide fiber.

The manufacture of a porous clad PCF is difficult because the porosity volume and distribution must be controlled in the preform. Further, the control of the PCF clad porosity must be maintained during drawing of the preform down to the dimensions of a waveguide fiber. Higher speed drawing does reduce manufacturing cost, which means that present PCF drawing processes increases factory cost. The drawing step occurs at very high temperatures and the final fiber diameter is small, about 125 $\mu$m. The drawing step must therefore include the maintaining a precise balance of pressure within the pore against viscous forces of the material surrounding the pore under relatively extreme conditions.

It is expected that the porous clad PCF will be susceptible to $OH^-$ contamination because at least a portion of the light carrying area of the fiber has a relatively large surface area open to atmosphere after the $OH^-$ removal step. The $OH^-$ removal step, known in the art, usually includes treating the heated preform with a reactive gas such as chlorine. An example of $OH^-$ contamination is shown in curve 2 of FIG. 1. The overall attenuation is high, being above about 20 dB/km over the wavelength range 800 nm to 1600 nm. In addition the $OH^-$ absorption peak 4 at 1250 nm, and, the local maxima 6 and 8, which characterize the broad $OH^-$ maximum from about 1390 nm to 1450 nm, are unacceptably high and essentially render the waveguide useless except perhaps in very short length applications.

The endlessly single mode property is however of sufficient value to attract workers to address the problem of PCF manufacture. Another incentive to develop a reliable and reproducible process for the PCF is the possibility of achieving unusual dispersion properties which can be used for example in dispersion compensating fiber. The dispersion compensating fiber compensates the dispersion in an existing communication link, thereby allowing operation of the link at a different wavelength. Another PCF advantage is that the large contrast available between core and clad effective index can be used to provide large effective area, thereby mitigating non-linear effects on transmitted signal integrity.

The present waveguide fiber and waveguide fiber preform disclosed and described herein reduces the unsatisfactory $OH^-$ contamination and effectively overcomes the problems in the prior art.

DEFINITIONS

The effective refractive index of a two or more component glass object, such as the clad layer in the PCF preform and PCF drawn therefrom, having a matrix of a first glass containing rods of a second glass, is defined as, $$n_{eff}^2 = [(1-f)n_{matrix}^2 + fn_{rod}^2] - \frac{\int |\nabla \Psi|^2 dA}{k^2 \int |\Psi|^2 dA}$$

where $\Psi$ is the solution of the scalar wave equation, k is the wave vector, f is fraction of the field in the rods and $n_{matrix}$ and $n_{rod}$ are the respective indices of the matrix and rod glass of the clad layer.

The scalar wave equation for light propagating in the z direction is: $\delta^2\Psi/\delta x^2 + \delta^2\Psi/\delta y^2 + [(kn_1)^2 - \beta^2]\Psi = 0$, where $\beta$ is the propagation constant, k the wave number and $n_1$ the core refractive index.

The effective V number is, $V_{eff} = 2\pi L/\lambda (n_{matrix}^2 - n_{eff}^2)^{1/2}$, where L is the pitch of the rod pattern and $\lambda$ is wavelength.

SUMMARY OF THE INVENTION

The PCF disclosed and described herein is free of air filled pores in the clad layer. The clad layer of the present fiber includes a matrix material and at least one additional material. The matrix material and the at least one additional material each have a refractive index and the respective refractive indexes are different from each other. The additional material is embedded in the matrix material. The volume and spacing of the embedded material is adjusted to provide a waveguide fiber having a wavelength range of single mode operation that is large without bound. That is the waveguide is endlessly single mode.

Because both the matrix material and the at least one additional material must transmit light in a pre-selected wavelength range, glass materials are good choices. The refractive indexes of the glasses can be raised or lowered by using appropriate dopant materials.

Thus the waveguide fiber preform and the fiber drawn therefrom meets the need for a PCF fiber which has uniform and reproducible performance, especially with regard to low spectral attenuation and geometry control.

A first aspect of the invention is an optical waveguide fiber preform having a core body surrounded by a clad layer made up of a plurality of clad rods. The clad rods each have a central portion, and a layer surrounding the central portion. The central portion of the clad rods has a refractive index different, by a pre-selected amount, from the refractive index of the surrounding layer. This refractive index difference together with the relative dimensions of the central portion and surrounding layer determine the effective refractive index of the clad layer and so affect fiber properties, for example, mode field diameter, cut off wavelength, zero dispersion wavelength, and effective area. The effective index of the clad layer must be lower than the core body refractive index in order for the assembly to ultimately become a light guiding structure. The clad rod diameters are selected to provide a final light guiding structure that is free of porosity. A maximum cross sectional dimension of the clad rods, in the preform, in the range of about 1.5 mm to 3.0 mm provides for a porosity free PCF after the preform is drawn to target fiber dimensions.

An assembly of the clad rods and core body may be held together by inserting it into holder such as a glass tube. One embodiment of the invention employs a glass tube and has a refractive index lower than that of either the central portion or the surrounding layer of the clad rod. As an alternative, the assembly can be bundled by using a frit to weld the preform parts together or by heating the adjoining parts to cause them to adhere to one another. An optically transparent adhesive may be used in place of the frit. Another alternative is to clamp the ends of the preform assembly in proper alignment and deposit a layer of glass soot on the assembly. Depending primarily upon the soot density or cohesive strength, the soot may be sintered to form a glass before or during the drawing of the preform.

The core body can be a solid, rod-shaped glass object. Alternatively, the core body can itself be composed of a group of individual rods. These individual rods forming the core body may all have substantially the same composition as one another or one or more pre-selected number of individual rods may have different compositions. The choice of compositions of the individual rods provides for certain optical characteristics of the fiber. For example, one could use a group of up-doped silica rods to form a central portion of the core body. A second group of pure silica rods could be arranged as a first layer around the central up-doped portion of the core body, and a third group of up-doped silica rods could be used to form a layer around the first layer. This configuration of individual rods forming the core body, results in a fiber whose core has a segmented refractive index profile after drawing the preform to waveguide fiber dimensions. A core body having a segmented refractive index profile can also be made in a separate process, such as, the outside or inside vapor deposition processes which are well known to those skilled in the art, and the core body so made inserted into the preform assembly.

Similarly, in another embodiment, the core body can be constructed to provide a graded index, i.e., a refractive index which varies in accord with a function relating that index to the radial position.

The preform structure provides essentially a limitless number of alternative configurations. The composition and arrangement of the individual rods forming the core body can be varied. So too the composition and arrangement of the clad rods forming the clad layer can be varied. Different combinations of core body and clad layer can then provide a preform assembly that can be used to provide numerous diverse preform structures that result in corresponding waveguide fibers having diverse functional properties. The only significant limitations on the useful rod configurations are as follows. The effective refractive index of the clad must be lower than the effective index of at least a portion of the core so that the structure will guide light. In addition, the weight-percent dopant must be consistent or competitive with low attenuation waveguide fibers. Also, the refractive index profile of core body and clad layer, which is determined by the composition and stacking pattern of the rods, is selected to provide a fiber having desired characteristics such as large effective area, low dispersion or dispersion slope, and, properly placed cut off or zero dispersion wavelengths. Finally, it is also favorable for the contrast of refractive index between the core body and clad layer indexes to be large within practical limits in order to minimize bend sensitivity of the fiber.

In further embodiments of the preform and fiber, the clad rods forming the clad layer can be made to have essentially any cross-sectional shape, such as a circle, ellipse, triangle, parallelogram, or polygon. Different clad rod shapes provide for different distributions, in the clad layer, of the clad rod central portion and the clad rod surrounding layer, thereby affecting the effective refractive index. It will be recalled that the effective refractive index of the clad layer depends upon the relative volume and distribution of the materials of the central portion and the surrounding layer of the clad rods. One particular embodiment has clad rods of circular cross section overall and a circular central region. In this case, the ratio of the diameter of the central clad rod portion to the outside diameter of the clad rod is preferably in the range of about 0.1 to 0.4, to provide a preform for the drawing of endlessly single mode waveguide fiber. However, using the PCF in a few-mode or multimode configuration is contemplated, so that useful ratios of central portion of clad rod diameter to overall clad rod diameter may provide a useful waveguide structure at values that range upward to 0.9 or higher. The circular clad rod embodiment can be arranged in a number of different patterns, such as a hexagonal close pack, a body-centered cubic structure, or a random structure. The random structure may be achieved through randomly placed spacer rods having a constant- or graded-index profile.

In addition, the clad rods may be arranged to form an asymmetric pattern such as is found in polarization-maintaining waveguide fiber. Groups of rods arranged in an asymmetric, random, or periodic pattern can further be grouped to form a larger independent pattern that is asymmetric, random, or periodic. Mirror and rotational symmetries can also be fabricated.

Thus, in one embodiment of the invention, the individual rods forming the core body or the clad rods forming the surrounding clad layer may be selected to provide a preform from which a polarization-maintaining fiber can be drawn. For example, the assembly of individual rods of the core body could be chosen such that the final shape of the core region, that is the drawn form of the core body, is elliptical. A number of different arrangements of individual rods forming the core body or clad rods forming the surrounding clad layer can similarly provide a preform having a predetermined birefringence characteristic, from which a waveguide fiber having desired birefringence can be drawn.

Variations of the preform embodiments that feature clad rods of different cross section may be achieved by changing the cross sectional shape of the core body or the individual rods forming the core body. The core body or individual rods forming the core body may take on any of the shapes set forth above with respect to the clad rods.

In an embodiment of the preform in which the core body is a single rod of circular cross section (to be used in a preform comprising circular clad rods) one preferred range for the core body diameter is about 1.5 mm to 3 mm. In another embodiment having circular cross sections of the core body and the clad rods of the clad layer, the core body diameter is about equal to that of the clad rods of the clad layer.

The characteristics of the preform, and thus of the fiber drawn therefrom, may also be selectively changed by filling in some or all of the interstitial voids which may be present in the preform assembly. Glass rods or glass-forming material in granular or powder form may be used for this purpose.

In yet another embodiment of the preform, the clad rods may include a material to enhance the photosensitivity of the glass, and the properties of the fiber drawn from the preform may then be more readily modified by irradiation. Materials such as germanium, antimony or boron are suitable.

The assembled preform therefore permits a great deal of flexibility in terms of fiber properties themselves, and how and when these properties may be altered.

Another example of this flexibility is an embodiment in which the clad rods contain a dopant material at a weight percentage sufficient to induce stress birefringence. The induced stresses can exist at the interface between the core body and clad rod layer, or at the interface between the central portion and the surrounding portion of each clad rod. Dopant levels of germania in the silica-based glass at a weight percentage in the range of about 30% to 50% are considered effective to induce the desired stress birefringence. Also considered effective is boron oxide doped into the silica-based glass at a weight percentage in the range of about 10% to 20%. Depending on clad rod arrangement, the resulting PCF can maintain an existing polarization state, or can reduce effects such as polarization mode dispersion by means of polarization mode mixing.

The waveguide fiber drawn from the preform, including its representative embodiments described herein, will have a clad layer which includes a matrix glass having glass columns embedded therein, in which the refractive index of the columns is lower than that of the matrix glass. It will be readily understood that the matrix glass corresponds to the surrounding layers of the clad rods and that the columns correspond to the central portions of the clad rods.

The core portion of the waveguide fiber may have a step index (resulting from using a single core rod of uniform composition) or a segmented refractive index profile design. The segmented index can be incorporated into a single core rod used in the preform assembly. The segmented index may also be formed using a plurality of core rods that make up the core body of the preform assembly.

The glass columns embedded in the clad layer of the waveguide may form a geometrically uniform, random, asymmetric, or periodic array. In a periodic array of silica glass columns embedded in a matrix glass of higher index, the pitch, that is, the spacing between column centers, may be in the range of about 0.4 $\mu$m to 40 $\mu$m. An asymmetry may be chosen to produce birefringence as is discussed above.

In one embodiment of the waveguide fiber, the relative refractive index difference between the column and matrix glass, as well as the shape and relative size of the glass columns are selected to provide single mode operation over a wide, essentially limitless, wavelength range. This is the endlessly single mode condition described and defined above. The range of optical transparency of glass materials is of particular interest in the field of telecommunications. The entire available range spans about 200 nm to 1700 nm, but there are currently two operating windows of greatest interest: a first window centered at about 1300 nm, and a second centered at about 1550 nm.

In one embodiment of the waveguide fiber, the columns have a circular cross-section of diameter in the range of about 1 $\mu$m to 35 $\mu$m.

DETAILED DESCRIPTION OF THE INVENTION

The light guiding principle of the non-porous clad PCF, disclosed and described herein, derives from the properties of its clad layer which is made up of two or more component materials. In such a clad layer an effective refractive index can be defined which is a combination of the refractive indexes of the component materials. The dependence of the effective refractive index on the refractive indexes of the clad layer components is expressed in terms of the ratio of the component material volume to the overall clad volume.

The value of the effective refractive index of the clad layer and the refractive index of the core body determine how the light power is distributed across the core body and a portion of the clad layer adjacent to the core body.

As is well known by those skilled in the art, the light power distribution in the waveguide determines essentially all the optical properties of the waveguide.

The clad layer of the PCF is made up of clad rods distributed around a core body to form a preform that is an assembly of the rods. This assembly is then drawn into a PCF. The use of sub-components, clad rods or individual rods that make up the core body, permits a great deal of flexibility in setting the parameters of the PCF.

Figure 8:
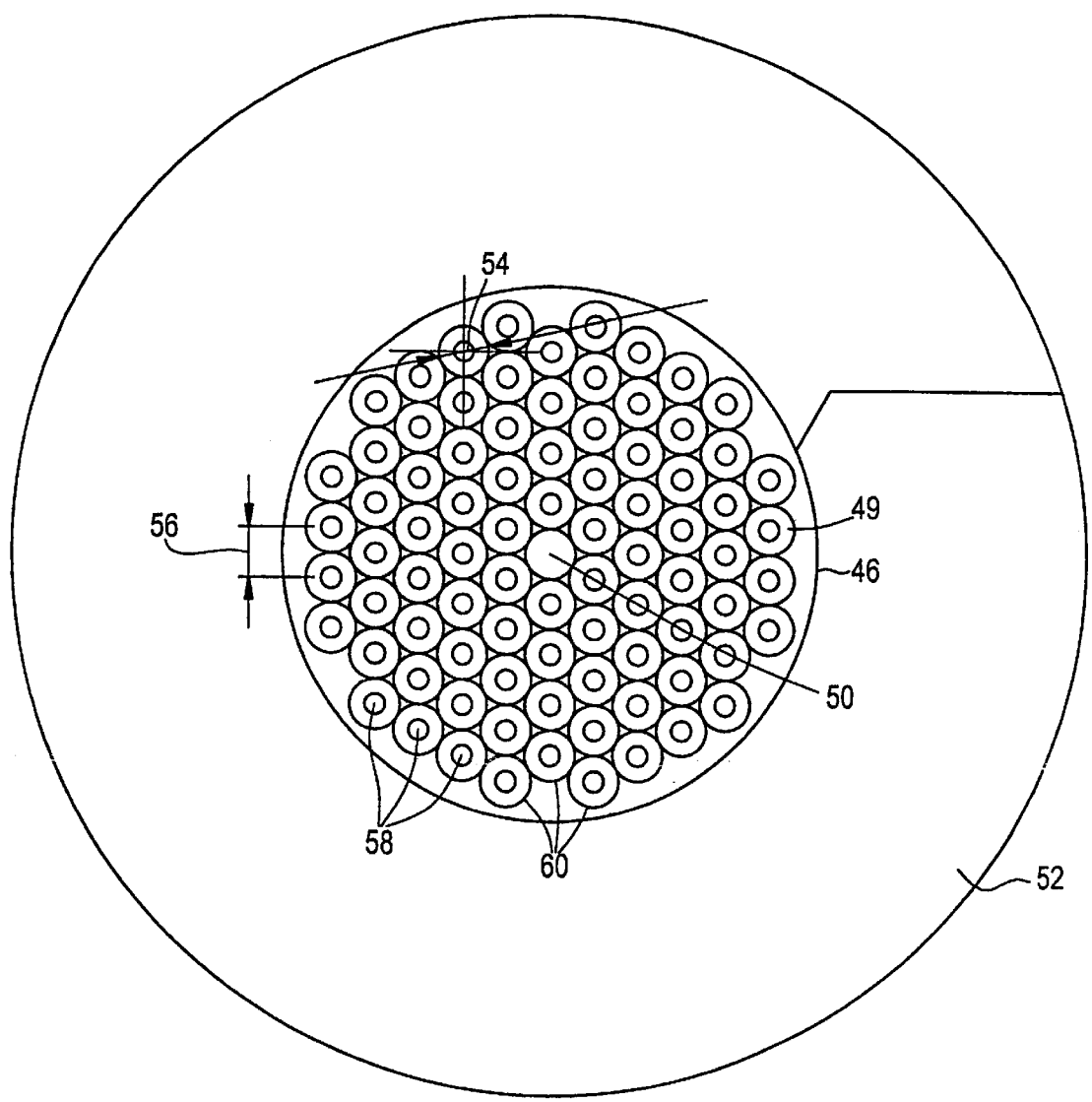
FIG. 8 illustrates one reduction to practice of a preform configuration, having a core body composed of a single uniform rod surrounded by a layer of circular clad rods; and, FIG. 9 is an end view of a waveguide fiber drawn from the preform of FIG. 8.

In the PCF discussed herein, the clad layer such as 58 in FIG. 8 provides for an effective refractive index because the clad layer 58 has two components possessing different refractive indexes.

Figure 3A:
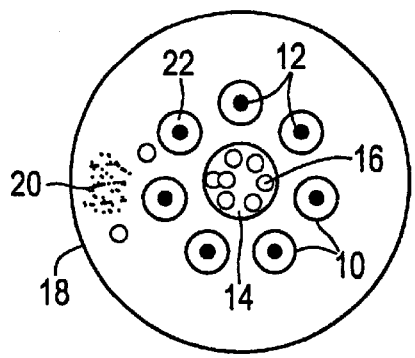
FIG. 3A is a cross section view illustrating a preform of this invention.

A cross-sectional view of a first embodiment of the preform 18 is shown in FIG. 3A. In this example, clad rods 10 have a central portion 12 that possesses a lower refractive index than the surrounding layer 22. The clad rods 10 have a circular cross section and all are substantially identical to each other. The clad rods 12 are arranged around the core body 14 to form an assembly comprising the clad rods and the core body. The rods 16 shown within the core body 14 indicate that the core body optionally can be made up of smaller sub-units, that is individual rods. In the case shown, the assembly components 10 and 14 are held in registration with one another by tube 18. The assembly can also be bundled using any of several clamping, chucking, wrapping, or other holding means known in the art. In addition a glass frit can be used to solder the components together. Also the components may be bundled temporarily while the assembly is heated to a temperature which causes the components to adhere to each other. The optional use of glass filler rods or granular glass forming particles to fill the interstices of the assembly is indicated by the series of dots and small circles 20.

Figure 3B:
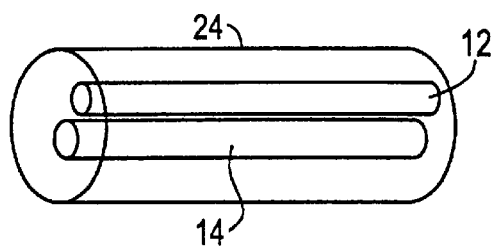
FIG. 3B is a side view of the preform of this invention or fiber drawn therefrom.

A side view of the preform or waveguide 18 (the figure is illustrative of both the preform and the waveguide drawn therefrom) is illustrated in FIG. 3B. The core body 14 and the representative clad rod are shown extending from one end to the other of the preform or fiber 24. Although core body 14 must extend from end to end of the fiber or preform to make the structure function as a waveguide, the clad rods 12 may be discontinuous as long as the effective refractive index of the clad is lower than that of at least a portion of the core body along substantially the full extent of the preform or waveguide.

Figure 4:
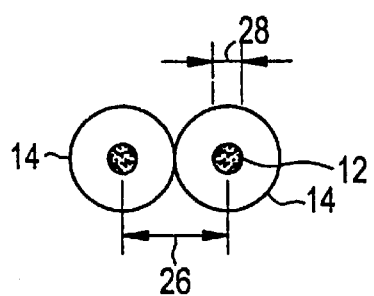
FIG. 4 shows the definition of diameter and pitch in the preform or fiber.

The two clad rods 14 in FIG. 4 illustrate the definitions of column diameter and pitch of the clad rod array. The column diameter 28 is shown as a side to side dimension of column body 12. The pitch 26 is the linear distance between corresponding points on the central portions of clad rods 14. These definitions pertain to both the preform assembly clad layer and the waveguide fiber clad layer.

Figure 5:
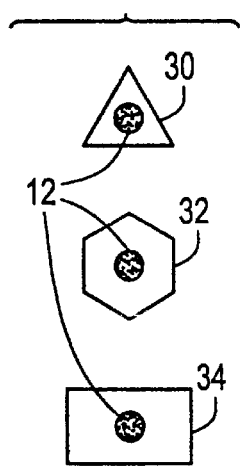
FIG. 5 shows alternative rod shapes for the core or clad rods.

Alternative embodiments of the clad rods are shown in FIG. 5. Three of the many useful shapes are shown as triangle 30, hexagon 32 and rectangle 34. In each embodiment, the central portion of the clad rod is shown as a circular region 12. However, it will be understood that the shape of the central portion may be changed because it is convenient to do so or because a desired PCF property is achieved thereby. The shapes of FIG. 5 may also represent alternative core body shapes. Such shape changes are contemplated as providing particular mode power distributions, which in turn determine the key functional properties of the PCF waveguide.

Figure 6:
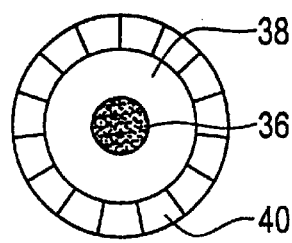
FIG. 6 illustrates a segmented core design in which the core has three segments.

Yet another embodiment of the core body is shown in FIG. 6. In this case, the core rod is a segmented core design having a central segment, 36, and respective first and second annular segments 38 and 40. The choice of shape, radius and relative refractive index of the segments 36, 38, and 40 determine the functional properties of the waveguide containing the segmented core. The segmented core principle and properties are discussed in several publications and patents, for example, U.S. Pat. No. 5,748,824, Smith, incorporated herein by reference, and so will not be discussed further.

Figure 7A:
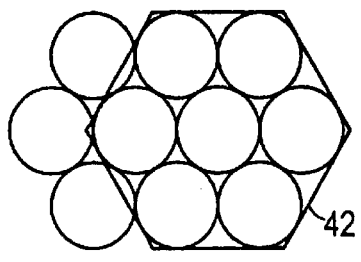
FIG. 7A illustrates a hexagonal close pack clad rod layer.
Figure 7B:
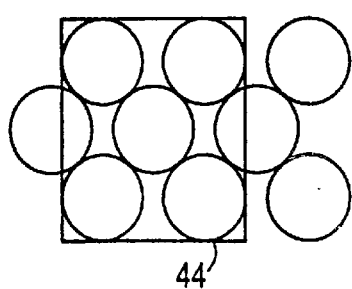
FIG. 7B illustrates a body centered cubic clad rod layer.

The embodiment in which the clad rods are cylindrical in shape can also provide for different waveguide function if the rods are arranged in pre-selected patterns, two of which are illustrated in FIGS. 7A & 7B. The hexagonal stacking pattern is shown as assembly 42 in FIG. 7A and the body-centered cubic pattern is shown as assembly 44 in FIG. 7B. This last pattern may also be called a face centered cubic structure without loss of clarity of meaning.

The cylindrical clad rod embodiment has been investigated further using a computer model to calculate key waveguide fiber properties. The properties so calculated are shown as the curves 46, 48, 50, 52, and 54 of FIG. 2. These curves are discussed further below.

EXAMPLE 1

Referring to FIG. 8, a preform 52 was constructed by inserting clad rods 48 and core rod 50 into tube 46. The clad rods 48 were placed in a periodic array about the core rod 50. The outer diameter of the core rod and the clad rods was about 2.4 mm. The diameter of the central portion of the clad rods, 54, was about 0.95 mm. The pitch 56 of the periodic array was about 2.4 mm. The outside diameter of the preform was about 50 mm.

The clad rods comprised a silica core portion 58 and a clad layer 60 of silica containing titania and having a Δ% of about 1%, where $$\Delta\% = 100 \times (n_1 - n_2)/n_1.$$

The refractive index denoted $n_1$ is that of the glass region having the Δ% value and $n_2$ is a reference refractive index usually taken as the refractive index of the base glass, which in this case is silica.

Figure 9:
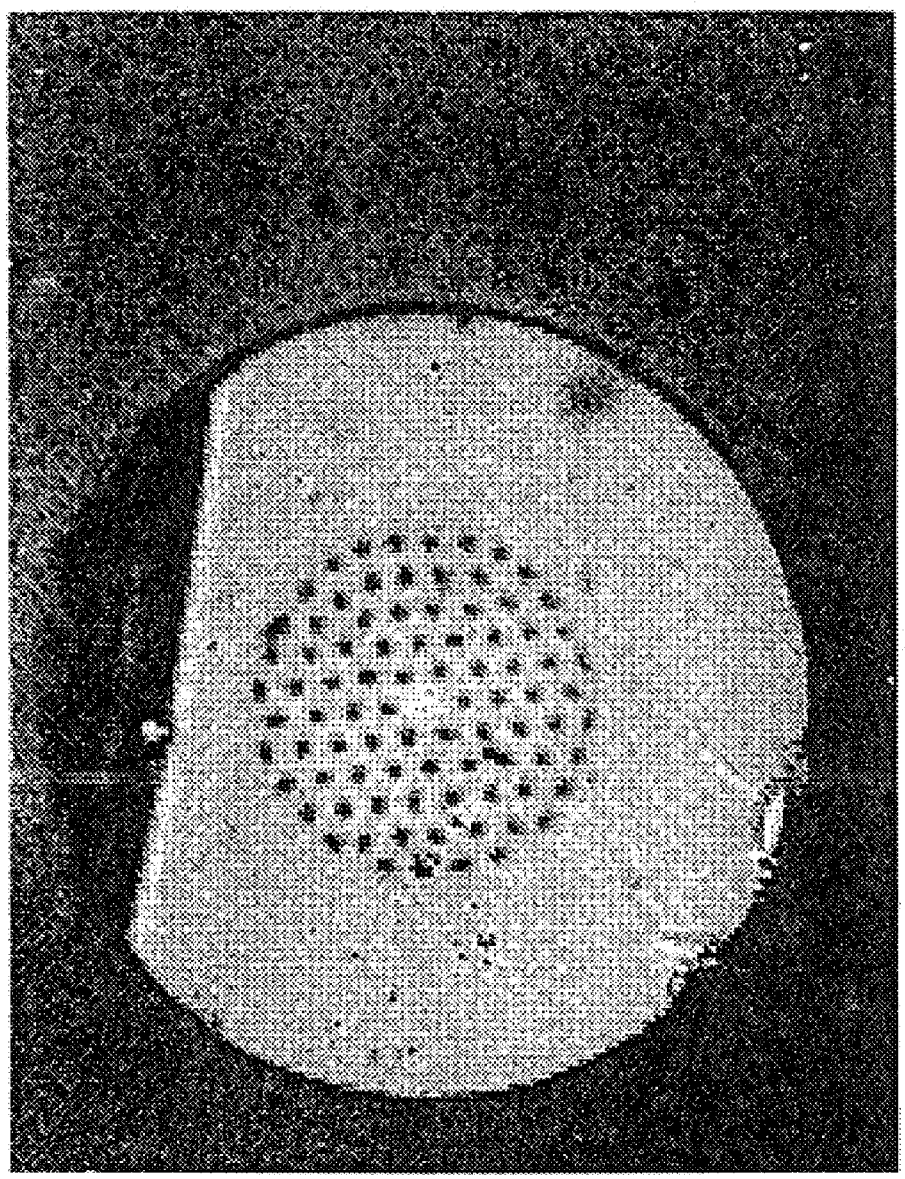

The preform was drawn into a PCF waveguide as illustrated in FIG. 9, which is derived from an end photograph of the fiber.

EXAMPLE 2

A PCF waveguide 24 having cylindrical clad rods 22 in FIG. 3A or 49 in FIG. 8, and cylindrical clad rod central portions 12 or 58 is modeled assuming a clad rod surrounding layer relative index of 2%. The relative index % of a structure is defined as $\Delta\% = (n_1 - n_2)/n_1$, where $n_1$ is the maximum refractive index of the glass region under consideration and $n_2$ is a reference index, in this example taken to be that of silica. When the preform using these clad rods is drawn into a waveguide fiber, the surrounding clad glass layer becomes the matrix glass of the fiber clad and the central portion of the clad rods becomes the glass columns embedded in the matrix. The glass columns in this example are chosen to be silica.

The clad rods are assembled about the core body to form a periodic array having pitch L, for example 56 is FIG. 8. The diameter of the glass columns is denoted d. The $V_{eff}$, which is descriptive of the number of modes the waveguide can support, is calculated for several values of the ratio d/L as measured in the fiber drawn from the preform.

Figure 1:
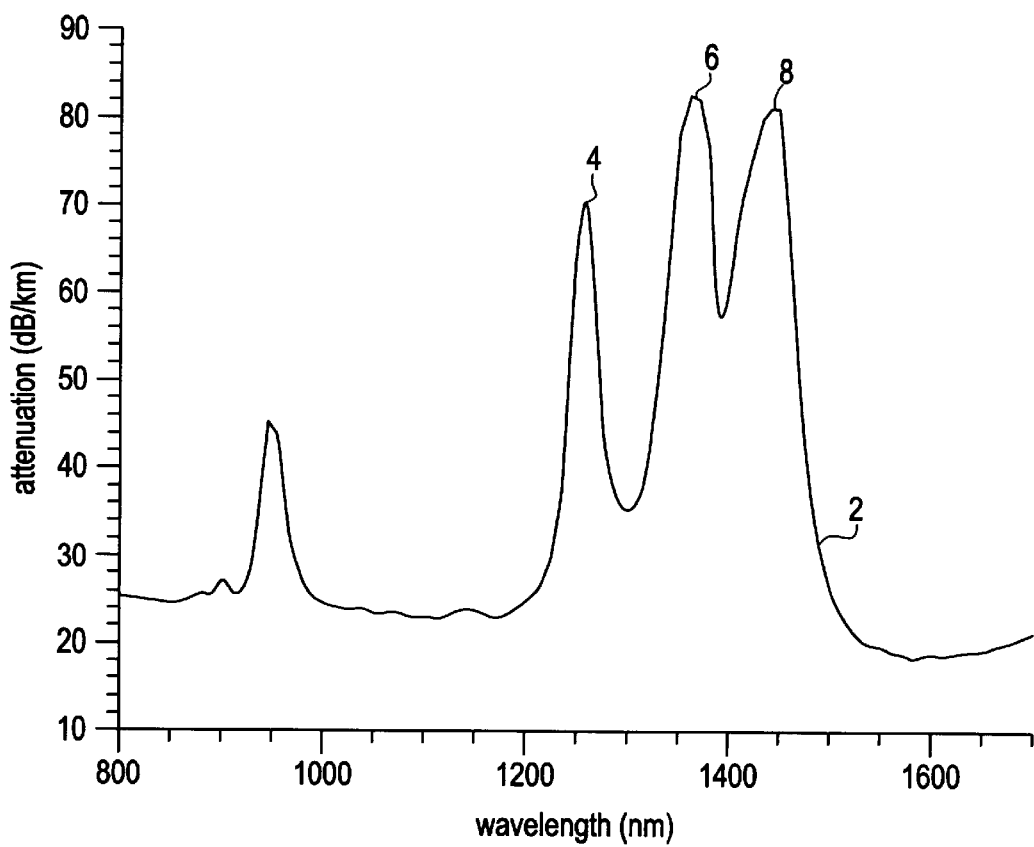
FIG. 1 is a spectral attenuation chart of a prior art fiber.
Figure 2:
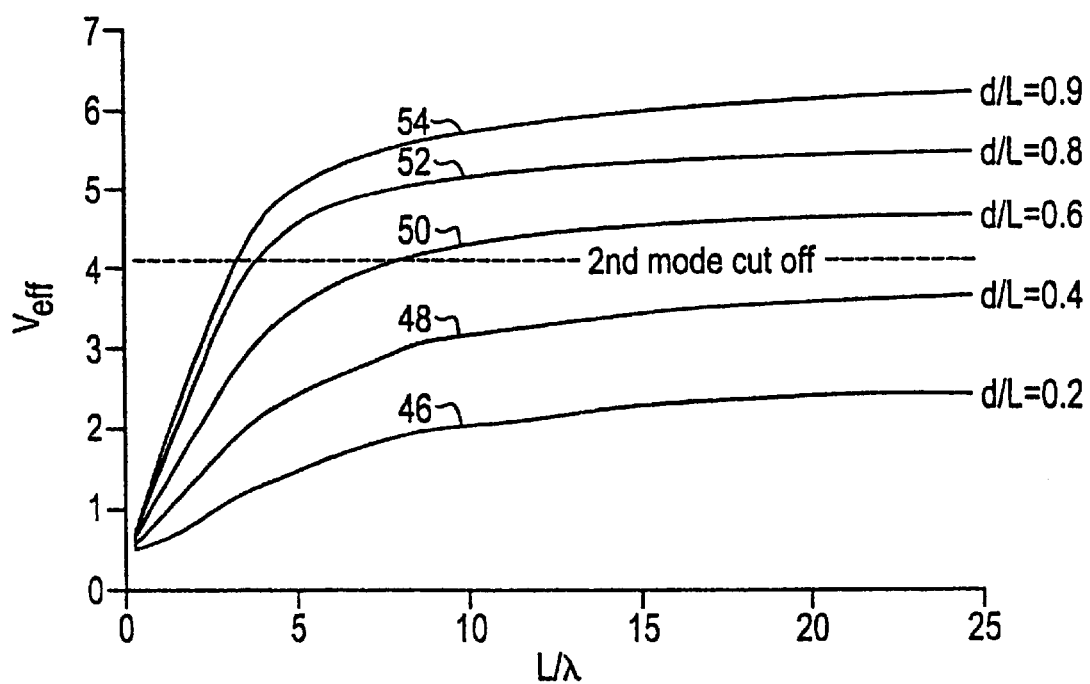
FIG. 2 is a chart of effective V number versus inverse wavelength for several choices of the ratio of column diameter to pitch of this invention.

The chart of FIG. 2 shows $V_{eff}$ as a function of inverse light wavelength scaled by the pitch of the array, L/λ. Curves 46 and 48 show that for d/L ratios of 0.2 and 0.4, the associated V numbers approach about 2.5 and 4 respectively as the wavelength decreases. Because the second mode of the example waveguide fiber cuts off at V of about 4, curves 46 and 48 show the waveguide to be single mode at essentially all wavelengths. This is the endlessly single mode condition. The geometry of the waveguide fiber is reasonable in that the pitch is of the order of several microns, about 1.5 μm to 39 μm, at an operating wavelength of 1550 nm. The column diameter follows the pitch and at the 1550 nm wavelength is in the range of about 1.4 μm to 36 μm. As the ratio of d/L increases to 0.6, 0.8, and 0.9, the $V_{eff}$ dependence changes as shown in curves 50, 52, and 54. The range of wavelengths for which the waveguide is single mode is reduced, which makes the choice of ratio a tradeoff with waveguide fiber performance. For example assuming a pitch of 10 μm, and a column diameter of 9 μm, the second mode cut off is about 4 μm, which is above the preferred operating range for telecommunication systems.

However, at a pitch of 10 μm, a column diameter of about 6 μm provides for single mode operation over the range 1530 nm to 1570 nm. In terms of FIG. 2, given the 10 μm pitch and the operating wavelength range, one possibility would be to design the clad in accord with curve 50. To reach the endlessly single mode condition, the design could follow curve 48, which calls for a column diameter of 4 μm.

This example illustrates the practicality of the non-porous PCF waveguide fiber in the endlessly single mode configuration. It will be understood that the preform and PCF drawn therefrom are not limited to the endlessly single mode configuration.

The need for pressure control in the preform during the draw step, an operation that is quite complex in terms of the control mechanism required, is obviated.

The principle PCF control step is moved to an earlier and less complex step in the process, i.e., the step in which the clad rod is fabricated.

Thus the control step occurs at a point in the process where control is easier and less cost has been incurred.

As is known in the art, the light transmission through a guiding structure is governed by Maxwell's equations. In the present case, the equations are written to include the dielectric nature of the material of which the waveguide is made and the structure of the clad layer, including the size and disposition of the clad rods.

The following discussion shows that the waveguide fiber and preform disclosed and described herein have properties which derive from Maxwell's equations (ME).

The V number which results from applying the ME to the present PCF determines the wavelength range over which the waveguide will transmit a certain number of modes. Of particular interest is the V number below which the waveguide transmits a single mode.

In terms of structure of the waveguide described herein, the effective V number is defined as $V_{eff} = 2\pi L/\lambda (n_{matrix}^2 - n_{eff}^2)^{1/2}$ where L is the pitch of the columns contained in the clad layer, and $\lambda$ the propagated light wavelength. To find the $V_{eff}$ at which the waveguide becomes endlessly single mode, one charts $V_{eff}$ for very large values of the ratio of column pitch transmitted wavelength. That is, the limit of $V_{eff}$ is found as $L/\lambda \to \infty$. If $V_{eff}$ approaches a constant value in the limit as the ratio $L/\lambda$ becomes large, $V_{eff}$ is independent of the transmitted light wavelength. The phenomenon of $V_{eff}$ becoming independent of propagated light wavelength is the defining characteristic of an endlessly single mode fiber. This effect stems from the dependence of $V_{eff}$ on the field $\Psi$, and cannot be explained by simply asserting that the field power is moving into or out of either the column or matrix portions of the clad layer.

An alternative approach to defining the appropriate $V_{eff}$ which provides an endlessly single mode condition is as follows. The effective refractive index of a two or more component glass object, such as the clad layer in the preform (and waveguide drawn therefrom) is defined as the propagation constant of the fundamental space-filling light mode divided by the vacuum wave number, or $n_{eff} = \beta_{FSM}/k$. The propagation constant $\beta$ is found from the ME solutions and k is $1/\lambda$, where $\lambda$ is the wavelength of the transmitted light. The ME are solved assuming that the outermost portion of the clad layer does not carry light. The fundamental space-filling mode (FSM) is the fundamental mode of the PCF if the core body was removed from the fiber. Therefore $\beta_{FSM}$ is the maximum propagation constant $\beta$ allowed in the cladding. An effective waveguide V-number $V_{eff} = (2\pi L/\lambda)(n_0^2 - n_{eff}^2)^{1/2}$ can also be defined. Here L is the pitch, $\lambda$ the wavelength, $n_0$ the core index, and $n_{eff}$ the effective index of the PCF clad defined above. For the $V_{eff}$ below a threshold value the fiber remains single-mode as can be seen in FIG. 2. The $n_{eff}$ and $V_{eff}$ can be calculated from full solutions to the ME, which are solved for the particular PCF geometry being considered. The results of such calculations are shown in FIG. 2. To simplify the calculation (carried out using a computer) the $n_{eff}$ and $V_{eff}$ can be approximated and their limiting behavior analyzed using the scalar wave equation set forth below. It is seen in FIG. 2 that the chart of $V_{eff}$ vs. $L/\lambda$ flattens out at shorter wavelengths (large $L/\lambda$ and can be made to stay below the cutoff value of about 4.1 for all wavelengths.

Thus one may reason as follows. In the short wavelength limit, the FSM will hardly penetrate into the low index portions of the clad layer. Because the field will only be non-zero in the higher index (e.g. germania/silica) clad layer portions, the field is effectively confined to a clad region of constant index. Thus the mathematical expression for the field is a universal function of normalized coordinates, independent of wavelength or the index in the PCF columns, but which depends upon the pitch (center to center spacing) of the clad structure.

The mathematical expression for the field will have the form, $$\Psi = G(x/L, y/L).$$

When this function is substituted into the scalar wave equation $$\delta^2\Psi/\delta x^2 + \delta^2\Psi/\delta y^2 + [(kn_0)^2 - \beta^2]\Psi = 0,$$

one finds $n_{eff}^2 = n_0^2 - g^2/(k^2L^2)$, where g is given by the solution of the wave equation. Thus $V_{eff} = g = $ constant in the limit of small wavelength so that the waveguide will remain single mode in the low wavelength limit.

This reasoning is set forth in support of the function of the PCF described and disclosed herein. A reasonable explanation of the phenomena is based upon sound physical principles. It will be understood that the validity of either of these interpretations of the effective V number and effective refractive index in no way affects the scope or validity of the invention described herein.

Although various embodiments of the invention have been disclosed and described herein, the invention is nonetheless limited only by the following claims.

We claim:

1. An optical waveguide fiber preform comprising:
   a core body having a longitudinal axis and an effective refractive index;
   a plurality of clad rods, each clad rod having a longitudinal axis, and including a central portion, and a layer surrounding the central portion;
   wherein the refractive index of the central portion is different from the refractive index of the layer surrounding the central portion by a pre-selected amount and the clad rod diameters are pre-selected; and,
   wherein the plurality of clad rods are held in position about the core body to form an assembly comprising a layer of clad rods surrounding the core body; and,
   wherein the pre-selected amount of difference between the respective refractive indexes of the clad rod central portion and the clad rod surrounding layer provides an effective refractive index of the layer of clad rods that is less than the effective refractive index of the core body.

2. The waveguide fiber preform of claim 1 wherein the refractive index of the core body is graded.

3. The waveguide fiber preform of claim 1 wherein the clad rods are held in position by a glass tube that surrounds the assembly.

4. The waveguide fiber preform of claim 3 wherein the refractive index of the glass tube is less than the refractive index of both the clad rod central portion and the clad rod layer surrounding the clad rod central portion.

5. The waveguide fiber preform of claim 1 wherein each of the clad rods has a cross section perpendicular to the longitudinal axis, a maximum cross section dimension in the range of 1.5 mm to 3.0 mm, and the cross section has a shape selected from the group consisting of a circle, an ellipse, a triangle, a parallelogram, and a polygon.

6. The waveguide fiber preform of claim 5 wherein the cross section of each clad rod is a circle and the central portion of each clad rod has a first diameter and the surrounding layer of each clad rod has a second diameter and the ratio of the first diameter to the second diameter is in the range of about 0.1 to 0.4.

7. The waveguide fiber preform of claim 6 wherein the layer of clad rods is arranged in a hexagonal close pack structure.

8. The waveguide fiber preform of claim 6 wherein the layer of clad rods is arranged in a body-centered cubic structure.

9. The waveguide fiber preform of claim 5 wherein the core body is a single rod having a cross section perpendicular to the longitudinal axis and the cross section has a shape selected from the group consisting of a circle, an ellipse, a triangle, a parallelogram, and a polygon.

10. The waveguide fiber preform of claim 9 wherein the cross section of the single core rod is a circle having a diameter in the range of about 2 mm to 3 mm.

11. The waveguide fiber preform of claim 1 wherein the plurality of clad rods are positioned having their longitudinal axes substantially parallel to the longitudinal axis of the core body and the positions of the clad rods are randomly arranged.

12. The waveguide fiber preform of claim 1 wherein the plurality of clad rods are positioned having their longitudinal axes substantially parallel to the longitudinal axis of the core body and the positions of the clad rods are periodically arranged.

13. The waveguide fiber preform of claim 1 further including rods having a uniform composition.

14. The waveguide fiber preform of claim 13 wherein the rods of uniform composition are placed among the plurality of clad rods to form a pre-selected pattern of clad rods.

15. The waveguide fiber preform of claim 14 wherein the pre-selected pattern of clad rods is selected from the group consisting of mirror symmetric patterns, rotational symmetric patterns, repeated asymmetric patterns, and a random pattern.

16. The waveguide fiber preform of claim 14 wherein the pattern of clad rods forms an asymmetric pattern from which a polarization maintaining waveguide fiber may be drawn.

17. The waveguide fiber preform of claim 1 wherein the assembly contains voids among the core body and clad rods of the assembly.

18. The waveguide fiber preform of claim 17 wherein at least some of the voids are filled with glass rods or a glass forming particulate material.

19. The waveguide fiber preform of claim 1 wherein the central portion or the layer surrounding the central portion of the clad rods is a silica based glass containing a material that enhances the photosensitivity of the clad layer.

20. The waveguide fiber preform of claim 19 wherein the photosensitivity enhancing material is selected from the group consisting of germanium, antimony, and boron.

21. The waveguide fiber preform of claim 1 wherein the central portion or the layer surrounding the central portion of the clad rods is a silica based glass containing a sufficient amount of dopant material to alter the coefficient of thermal expansion of the central portion relative to the surrounding layer glass, to the extent that a stress birefringence is induced in the clad rods to provide a preform from which a polarization maintaining waveguide fiber is drawn.

22. The waveguide fiber preform of claim 21 wherein the layer surrounding the central portion of the clad rods is a silica based glass that contains the dopant germania having a weight percent in the range of 30% to 50%.

23. The waveguide fiber preform of claim 21 wherein the central portion of the clad rods is a silica based glass that contains the dopant boron having a weight percent in the range of 10% to 20%.

24. The waveguide fiber preform of claim 21 wherein the layer surrounding the central portion of the clad rod is a silica based glass doped with a material selected from the group consisting of germania and titania.

25. The waveguide fiber preform of claim 1 wherein the central portion of the clad rods is a silica based glass doped with a material selected from the group consisting of fluorine and boron.

26. An optical waveguide fiber drawn from the preform of any one of claims 1, 2, or 3–25.

27. An optical waveguide fiber comprising:
   a core region of material having a refractive index; and,
   a clad layer surrounding and in contact with the core region, wherein the clad layer includes a matrix material and a material formed into a plurality of columns, the column material, having a first refractive index, and being embedded as an array of columns in the matrix material, having a second refractive index;
   wherein, the refractive index of the column material is different from the refractive index of the matrix material by an amount such that at least a portion of the core region material has a refractive index greater than the effective refractive index of the clad layer.

28. The waveguide fiber preform of claim 27 wherein the material of the core region is the same as the material of the matrix glass.

29. The waveguide fiber of claim 27 wherein the plurality of columns of the array are continuous from end to end of the fiber and each column has a longitudinal axis aligned substantially parallel to the length dimension of the fiber and the array of columns is random.

30. The waveguide fiber of claim 27 wherein the plurality of columns of the array are continuous from end to end of the fiber and each column has a longitudinal axis aligned substantially parallel to the length dimension of the waveguide and the array of columns is periodic.

31. The waveguide fiber of claim 30 wherein the pitch of the periodic array of columns is in the range of about 0.4 $\mu$m to 40 $\mu$m.

32. The waveguide fiber of claim 31 wherein a cross section of the core region, taken perpendicular to the length dimension of the fiber, is a circle having a diameter chosen such that the fiber transmits a single mode over a pre-selected wavelength range.

33. The waveguide fiber of claim 32 wherein the wavelength range is about 200 nm to 1700 nm.

34. The waveguide fiber of claim 27 wherein the diameter of each of the plurality of columns is in the range of 1 $\mu$m to 35 $\mu$m.

* * * * *